United States Patent
Tomita

(10) Patent No.: US 8,194,259 B2
(45) Date of Patent: Jun. 5, 2012

(54) INFORMATION PROCESSING APPARATUS, INFORMATION PROCESSING METHOD AND COMPUTER-READABLE RECORDING MEDIUM

(75) Inventor: Takehito Tomita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 663 days.

(21) Appl. No.: 12/351,117

(22) Filed: Jan. 9, 2009

(65) Prior Publication Data

US 2009/0180146 A1 Jul. 16, 2009

(30) Foreign Application Priority Data

Jan. 16, 2008 (JP) .................. 2008-006914

(51) Int. Cl.
*G06F 3/12* (2006.01)
(52) U.S. Cl. ...................... 358/1.13; 358/1.15
(58) Field of Classification Search ........................ None
See application file for complete search history.

(56) References Cited

U.S. PATENT DOCUMENTS

2005/0120244 A1* 6/2005 Choi ............................. 713/201
2007/0030511 A1* 2/2007 Lee ............................. 358/1.15

FOREIGN PATENT DOCUMENTS

| JP | 08-314659 | 11/1996 |
|----|-----------|---------|
| JP | 11-027448 | 1/1999 |
| JP | 2002-172821 | 6/2002 |
| JP | 2005-092731 | 4/2005 |
| JP | 2006-209508 | 8/2006 |
| WO | WO 2005-055044 | 6/2005 |

OTHER PUBLICATIONS

Takeshi Muto "Road to Becoming a Master of Debian—Learning on the Latest Version-" NIKKEI Linux, vol. 9, Issue No. 11, Nikkei Business Publications, Inc., Japan, Nov. 8, 2007 pp. 129-138.
Kazukuni Saito "Fedora 7 Network Server Construction Guide, First Edition" Kouchikukenkyuukai, Shuwa System Co., Ltd., Sep. 1, 2007 pp. 950-952.

* cited by examiner

*Primary Examiner* — Twyler Haskins
*Assistant Examiner* — Lennin Rodriguez
(74) *Attorney, Agent, or Firm* — IPUSA, PLLC

(57) ABSTRACT

An information processing apparatus is connected to a client apparatus and an image forming apparatus, the information processing apparatus including a large capacity memory device; a common interface device; a reception part compatible with the common interface device; and a transmission part compatible with the common interface device, wherein the reception part receives data for an image forming request from the client apparatus via the common interface device and stores the data on the large capacity memory device, and the transmission part transmits the data for the image forming request stored on the large capacity memory device to the image forming apparatus via the common interface device.

11 Claims, 8 Drawing Sheets

INFORMATION PROCESSING APPARATUS, INFORMATION PROCESSING METHOD AND COMPUTER-READABLE RECORDING MEDIUM

BACKGROUND OF THE INVENTION

1. Field of the Invention

The present invention generally relates to an information processing apparatus, an information processing method, and a computer-recording medium, and more specifically, to an information processing apparatus connected to an image processing apparatus, an information processing method and a computer-recording medium.

2. Description of the Related Art

Conventionally, there are known copy machines, printers, and image forming apparatuses such as multi-functional apparatuses that are provided with a large capacity memory device such as a hard disk drive (HDD). Some of these apparatuses include data storage functions that store data obtained from scanning data or data received via a network (for example, in patent document 1: Japanese Patent Application Publication No. 2002-172821). Such a data storage function enables various types of highly convenient services such as reuse of data or the like.

However, a large capacity memory device raises the cost of hardware of an image forming apparatus when included in the image forming apparatus. For this reason, generally, most low-end apparatuses do not include large capacity memory devices.

The present invention takes into consideration the issues described above.

SUMMARY OF THE INVENTION

According to one aspect of the present embodiment of the invention, an information processing apparatus is connected to a client apparatus and an image forming apparatus, the information processing apparatus including a large capacity memory device; a common interface device; a reception part compatible with the common interface device; and a transmission part compatible with the common interface device, wherein the reception part receives data for an image forming request from the client apparatus via the common interface device and stores the data on the large capacity memory device, and the transmission part transmits the data for the image forming request stored on the large capacity memory device to the image forming apparatus via the common Interface device.

Another aspect of the present invention may be to provide an information processing method executed by an information processing apparatus including a large memory capacity device, in which the information processing apparatus is connected to an image forming apparatus including a common interface device, the information processing method including the steps of: receiving data concerned with an image forming request from a client apparatus via the common interface device; storing the data on the large capacity memory device; and transmitting the data stored on the large capacity memory device to the image forming apparatus for the image forming request via the common interface device.

Other objects, features and advantages of the present invention will become more apparent from the following detailed description when read in conjunction with the accompanying drawings.

DETAILED DESCRIPTION OF THE PREFERRED EMBODIMENTS

Figure 1:
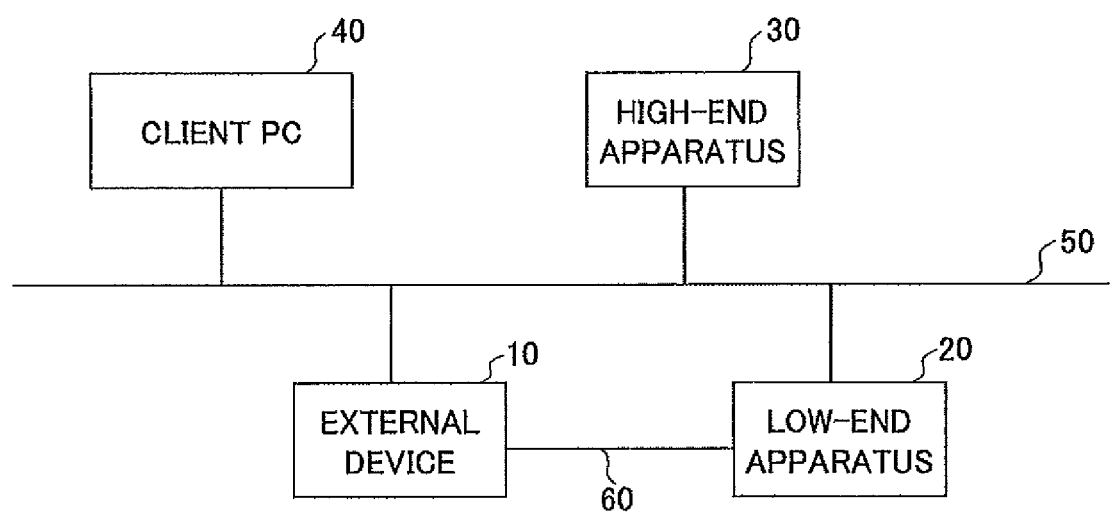
FIG. 1 is a drawing showing an example of a system configuration of the present embodiment.

In the following, this invention will be described using drawings. FIG. 1 shows an example of a system configuration based on an embodiment of this invention. In FIG. 1, an external device 10, a low-end apparatus 20, a high-end apparatus 30, and a client PC 40 or the like are connected via a network 50 such as a LAN (Local Area network). The network may include a cable network, a radio communication network or the like.

The low-end apparatus 20 and the high-end apparatus 30 may be an image forming apparatus such as a multi-functional apparatus, a copy machine, a printer or a FAX machine. The low-end apparatus 20 includes a memory that has a relatively small capacity, and does not include a large capacity memory device such as a HDD (Hard Disk Drive). The high-end apparatus 30 includes a memory that has a relatively larger capacity, and includes a large capacity memory device such as a HDD.

The client PC 40 transmits, in response to an input by a user, an image forming request such as a print request, a FAX transmission request or the like to the low-end apparatus 20 or the high-end apparatus 30.

The external device 10 is an information processing apparatus used to provide a function equivalent to that of the high-end apparatus 30 for the client PC 40 (user) in combination with the low-end apparatus 20. Further, the external apparatus 10 and the low-end apparatus 20 may be directly connected via a USB (Universal Serial Bus) or a cable such as a LAN cable 60, or via a radio communication network. In this case, the low-end apparatus 20 does not need to be connected to the network 50.

Figure 2:
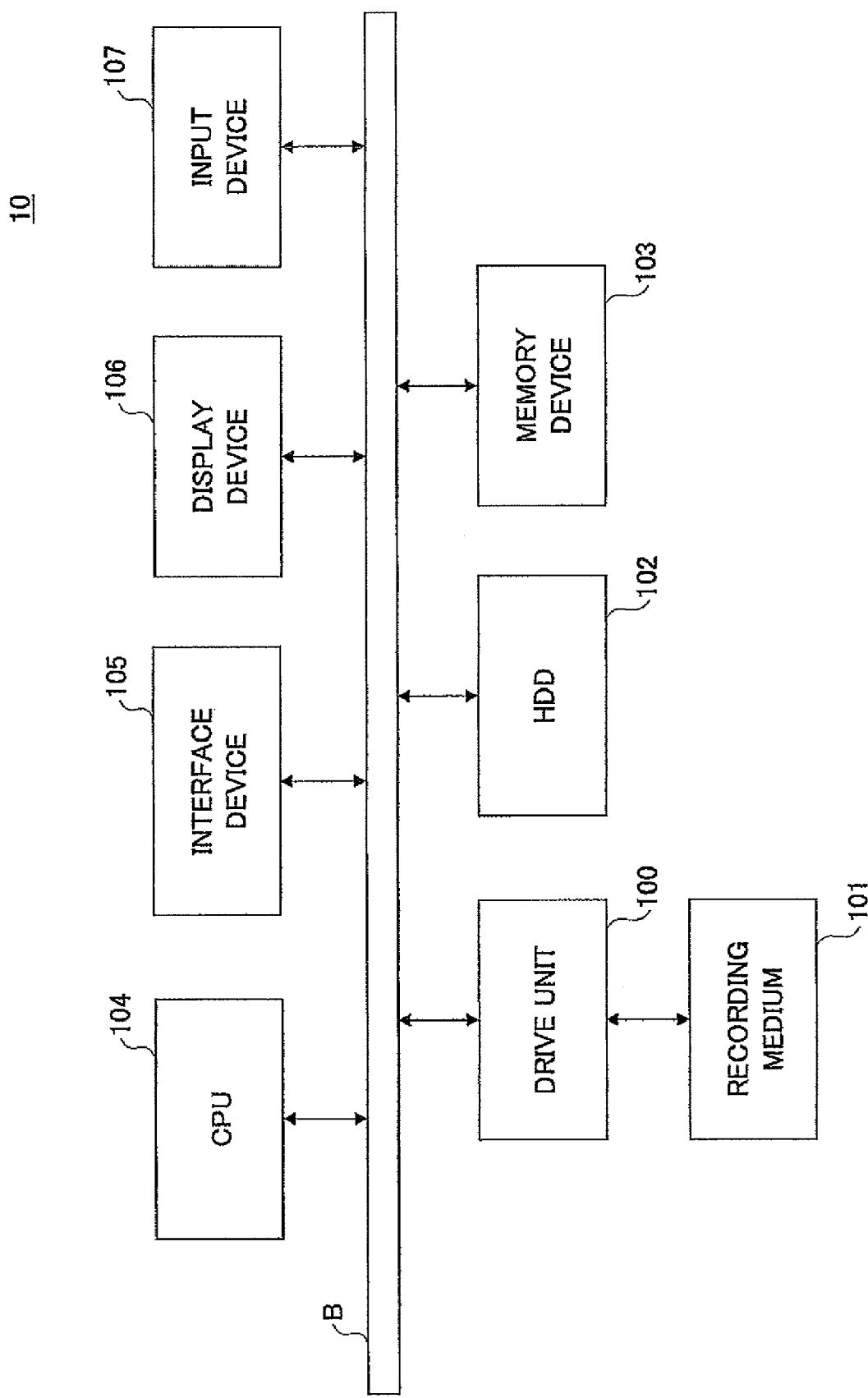
FIG. 2 is a drawing showing an example of a hardware configuration of an external device of the present embodiment.

FIG. 2 is a drawing showing an example of a hardware configuration of the external device 10 according to the present embodiment. In FIG. 2, the external device 10 is configured to include a drive unit 100, a HDD 102, a memory device 103, a CPU 104, an interface device 105 (common interface device), a display device 106, and an input device 107, in which each of them is connected to each other via a bus B.

A program used in the external device 10 is provided with a recording medium 101 such as a CD-ROM. When the recording medium 101 is loaded into the drive unit 100, the program is installed from the recording medium 101 to the HDD 102 via the drive unit 100. The HDD 102 stores the installed program with necessary files and data or the like.

The memory device 103 reads the program from the HDD 102 and stores the program in response to an instruction for starting the program. The CPU 104 executes the program stored in the memory device 103 to achieve a function of the external device 10. The interface device 105 (common interface device) is used to connect to the network 50. The display device 106 displays a GUI (Graphical User Interface) or the like based on the program. The input device 107 is configured with various buttons and used to input different operation instructions (instruction input). The display device 106 and the input device 107 may be integrated as an operational panel.

Further, the way of installing the program is not limited by use of the recording medium and may be achieved by downloading from another computer via a network.

Figure 3:
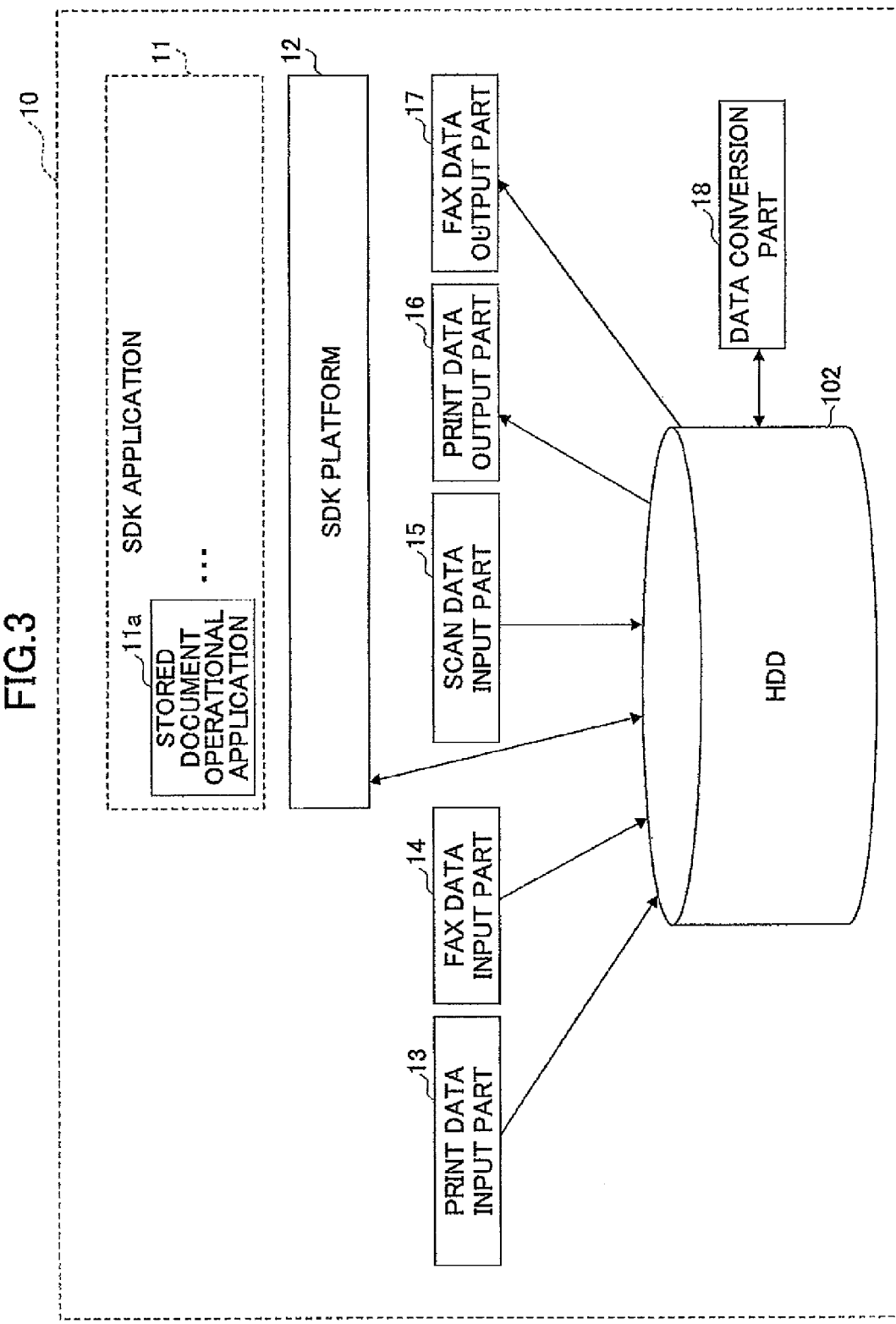
FIG. 3 is a drawing showing another example of a hardware configuration of an external device of the present embodiment.

FIG. 3 is a drawing showing an example of a software configuration of the external device 10 according to the present embodiment. In FIG. 3, the external device 10 includes an SDK application 11, an SDK platform 12, a print data input part 13, a FAX data input part 14, a scan data input part 15, a print data output part 16, a FAX data output part 17, and a data conversion part 18.

The SDK application 11 is application software that is developed by using a specific SDK (Software Development Kit). An application, which is developed with the SDK after the external device 10 has been purchased by a user, can be installed and executed with the external device 10. A stored document operational application 11a (a list display part) is shown in FIG. 3 as an example of the SDK application 11.

The SDK platform 12 is a software component that provides the SDK application 11 an API (Application Program Interface) of an SDK. In other words, the SDK platform 12 makes it possible to execute the SDK application 11. Further, the SDK platform 12 includes a local storage API for accessing the HDD 102. The SDK application 11 can execute operations (data input/output, acquiring a data list, and deletion of data or the like) associated with the HDD 102 by using the local storage API.

The print data input part 13 receives print data transmitted from the client PC 40, and stores (accumulates) the print data on the HDD 102. The data of a network print job is transmitted by a normal port No. 9100 to adjust to the type of a printer that is based on a PDL (Page Description Language) or the like. The print data input part 13 provides the client PC 40 an interface (common interface device) similar to that of the printer (receiving the print data transmitted by the port No. 9100), so that the print function (printer) of the low-end apparatus 20 is emulated and the received data are stored on the HDD 102 as a stored document.

The print data output part 16 transmits, to the low-end apparatus 20, the print data (stored document) stored on the HDD 102 upon a request for printing the print data. More specifically, after receiving an instruction from the SDK application 11 via the SDK platform 12 to execute printing of the stored document, the print data output part 16 reads the designated data from the HDD 102 and performs an operation for the low-end apparatus 20 as if the print data output part 16 operates for the client PC 40 (for example, the print data are transmitted via an interface (common interface device), e.g. port No. 9100, which is provided by the low-end apparatus 20 for the client PC 40). This causes the client PC 40 to be emulated and the low-end apparatus 20 to execute printing of the print data.

Figure 4:
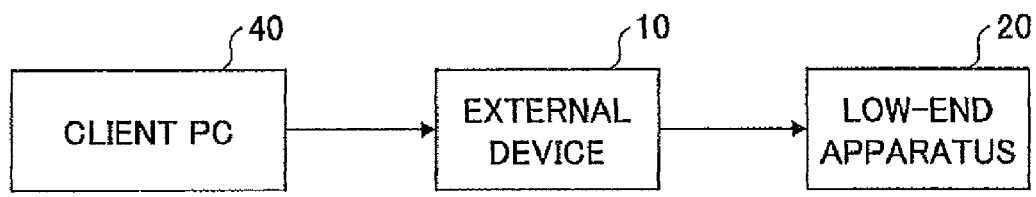
FIG. 4 is an illustration indicating a print data path from a client PC to a low end device.

The print data, which is transmitted from the client PC 40 to the low-end apparatus 20 via the print data input part 13 and the print data output part 16, follows the following path. FIG. 4 is a drawing showing the path of the print data from the client PC 40 to the low-end apparatus 20.

As shown in FIG. 4, the print data from the client PC 40 is received by the print data input part 13 of the external device 10 and stored on the HDD 102. Next, the print data output part 16 forwards the print data stored on the HDD 102 to the low-end apparatus 20. As the print data follows this path, the print data can be stored on the external device 10 and be available for reuse. Basically, the client PC 40 needs to install a printer driver that can be used by the low-end apparatus 20, and establishes the IP address of the external device 10 as the IP address of a printer corresponding to the printer driver. By this procedure, it becomes possible that the instruction for printing (print data) for the low-end apparatus 20 is transmitted to the external device 10.

FIG. 3 will be described below. The FAX data input part 14 receives FAX transmission data sent (transmitted) from the client PC 40 or the like and stores the FAX transmission data on the HDD 102. As for the PC-FAX (between PC and FAX), data corresponding to the type of a printer can be transmitted via the normal port No. 9100. The FAX data input part 14 provides the client PC 40 an interface device (common interface device) which is similar to that provided for the FAX (accepts the data transmitted from the port No. 9100). This enables emulating the function of the FAX of the low-end apparatus 20, so that the obtained data can be stored on the HDD 102 as a stored document data.

The FAX data output part 17 requests the low-end apparatus 20 to transmit the stored document data by transmitting the stored document data stored on the HDD 102 to the low-end apparatus 20. More specifically, when having received instruction from the SDK application 11 for executing a FAX transmission of the stored document data via the SDK platform 12, the FAX data output part 17 reads the designated data from the HDD 102 and performs the operation as if the client PC 40 operates for the low-end apparatus 20 (for example, the low-end apparatus 20 transmits FAX data via the interface (e.g. port No. 9100) that is provided for the client PC 40). This causes the client PC 40 to be emulated and the low-end apparatus 20 to execute transmission of the FAX data.

Further, FAX data from the client PC 40 to the low-end apparatus 20 follow the path shown in FIG. 4 via the FAX data input data 14 and the FAX data output part 17.

The scan data input part 15 receives scanned data (scan data) obtained by the low-end apparatus 20 and stores the scan data on the HDD 102.

The data conversion part 18 executes format conversion of data which are stored on the HDD 102 via the print data input part 13, the FAX data input part 14 or the scan data input part 15. This is because data formats stored on the HDD 102 are generally different between print data, FAX transmission data, scan data and the like. Thus, there is a limitation that the data stored via the print data input part 13 are only available for printing documents. For this issue, the data conversion part 18 provides a function that performs data conversion of respective formats, enables printing of scanned data, faxes data that have been input for printing documents or the like. This allows a flexible combination between various input data parts and output data parts. Further, conventional techniques can be used for data conversion procedures.

On the other hand, the SDK platform 12 of FIG. 3 is included in the external device 10 to provide the compatibility with the SDK platform that is included in the high-end apparatus 30. The high-end apparatus 30 includes a sufficient memory capacity for installation of the SDK application 11 on the SDK platform 12 to operate the SDK platform 12 and the SDK application 11.

The low-end apparatus 20 does not include a memory device necessary for operating the SDK platform 12. By connecting the external device 10 to the low-end apparatus 20, the SDK application 11 is operated. Further, a software engine needed for forming images is provided with the software engine of the low-end apparatus 20. This enables the low-end apparatus 20 to perform a function equivalent to that of the high-end apparatus 30. Further, since the low-end apparatus 20 does not include an HDD, the external device 10 is provided with an HDD so that the compatibility of the SDK platform 12 is achieved for the API used for a local storage.

Figure 5:
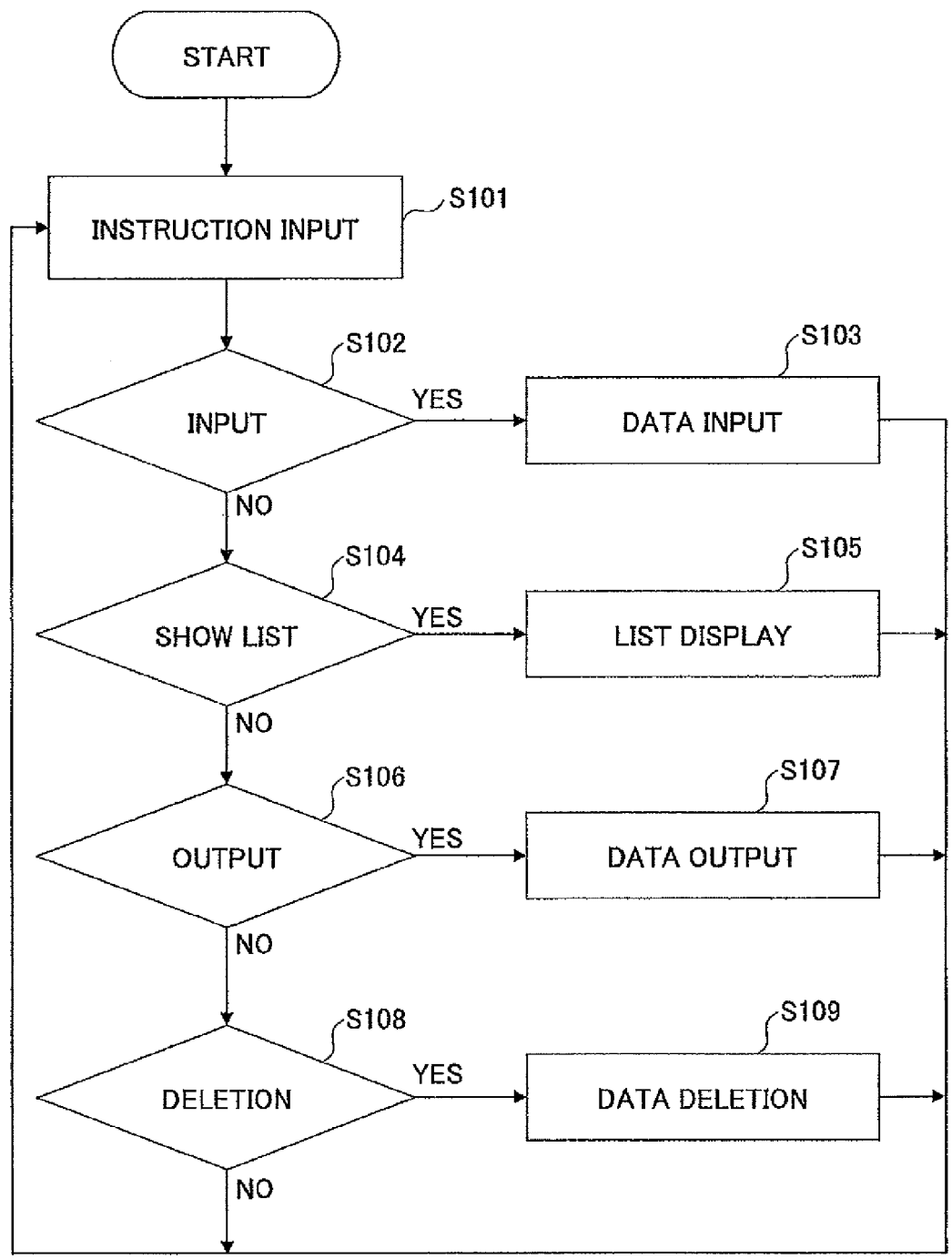
FIG. 5 is a flowchart for describing a processing step of the external device.

In the following, the processing procedure of the external device 10 is explained. FIG. 5 is a flowchart to explain the processing procedure of the external device 10.

In step S101, an operation instruction is input to the external device 10. After this step, an operation step proceeds based on the type of each operation instruction.

For example, when the instruction (instruction input) is made to input data (Yes in step S102), the external device 10 inputs data and stores the data on the HDD 102 (S103). More specifically, if the operational instruction is print data to be transmitted from the client PC 40, the print data (print request) are received by the print data input part 13. The print data input part 13 stores the received print data on the HDD 102. Further, if the operation instruction is FAX transmission data to be transmitted from the client PC 40, the FAX transmission data (FAX transmission request) are received by the FAX data input part 14. The FAX data input part 14 stores the received FAX transmission data on the HDD 102. Also, if the operation instruction is to store scan data transmitted from the low-end apparatus 20, the scan data are received by the scan data input part 15. The scan data input part 15 stores the received scan data on the HDD 102.

On the other hand, when the operation instruction (instruction input) is an instruction to display a list of stored documents which are input from the input device 107 (Yes in step S104) by a user, a stored document operational application 11a (a list display part) acquires data stored on the HDD 102 via the SDK platform 12, and displays a screen (hereafter, a stored document list screen) showing contents that contain the list of the acquired data (list of stored document) on the display device 106 (S105).

Figure 6:
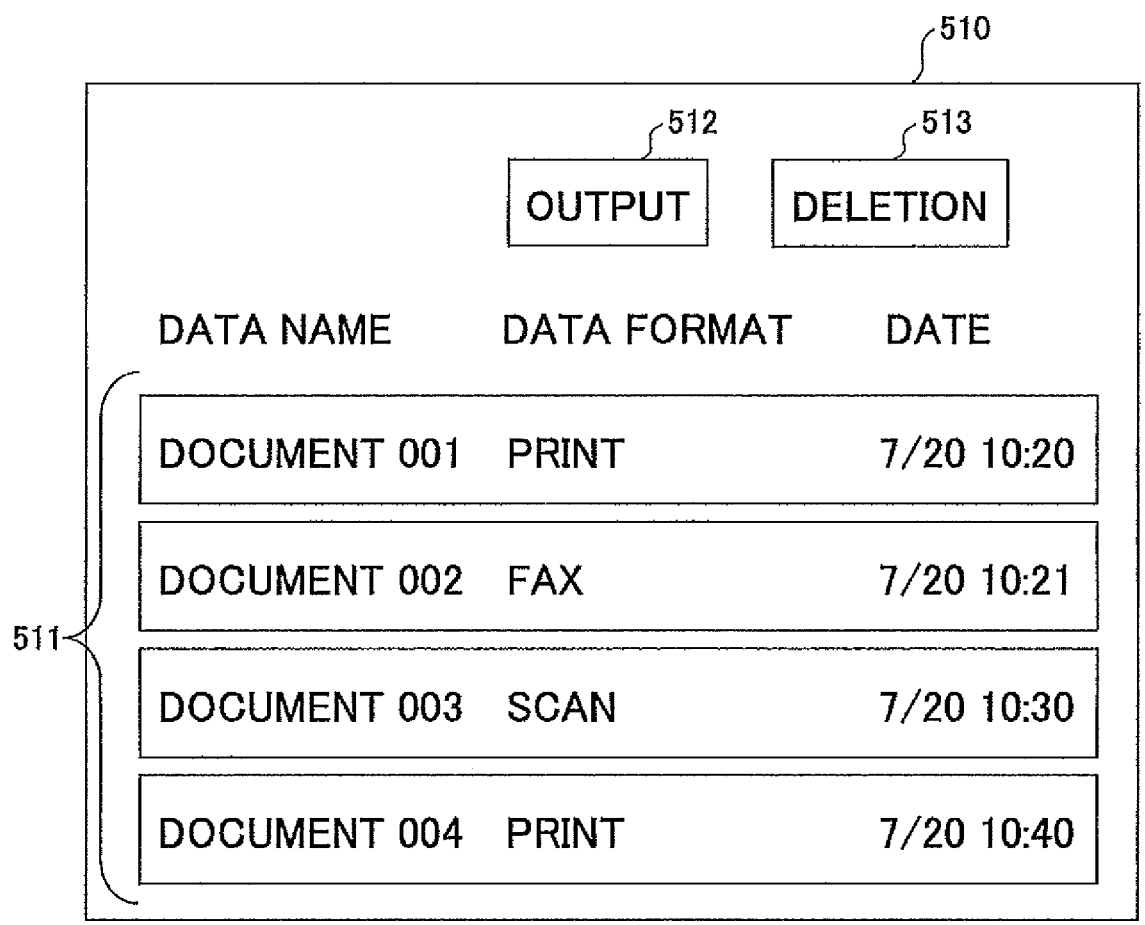
FIG. 6 is a drawing showing an example of a screen displaying a list of stored documents.

FIG. 6 is a drawing showing an example of a display screen of a stored document list screen 510. In FIG. 6, the stored document list screen 510 includes a list display area 511, an output button 512, a deletion button 513 and the like.

The list display area 511 is an area where a list of stored documents is indicated. The example of FIG. 6 indicates data name, data format, and date based on types of data. The data format is categorized by a print format, a FAX data format, or a scan data format, in which the data format is determined by types of input data parts (print data input part 13, FAX data input part 14, or scan data input part 15) having been used for inputting the data. The date indicates the input date of data.

The output button 512 is provided to receive an instruction for outputting data selected at the list display area 511. The deletion button 513 is provided to receive (input) an instruction for deleting data selected at the list display area 511.

If the operation instruction is given by a press of the output button 512 (Yes in step S106), the stored document operational application 11a instructs, via the SDK platform 12, the output part (print data output part 16, FAX data output part 17) corresponding to the selected data format to output the selected data. The print data output part 16 or the FAX data output part 17 requests (S107) the low-end apparatus 20 to print the selected data or to perform FAX transmission of the selected data.

Further, the stored document application 11a may instruct the display device 107 to display a screen that allows selection of an output type (printing data or FAX data transmission) in response to the output button 512 being pressed. If the output type selected on the screen does not match with the selected data format, after converting the selected data to a data format that corresponds to the output type by utilizing the data conversion part 18, the stored document operational application 11a may instruct the print data output part 16 or the FAX data output part 17 to output the data.

Further, when outputting the data, the stored document operational application 11a may instruct the display device 107 to show an instruction screen which allows input of authentication information (use of an ID card or a password). As a result, secured printing becomes possible, since only an authenticated user can obtain the document which is output (printed) by the low-end apparatus 20 in response to an operational instruction given by the client PC 40.

Further, if an operation instruction is given by a press of the deletion button 513 (Yes, in step S108), the stored document operational application 11a executes deletion of selected data via the SDK platform 12 (S809). In this way, the selected data are deleted.

Figure 7:
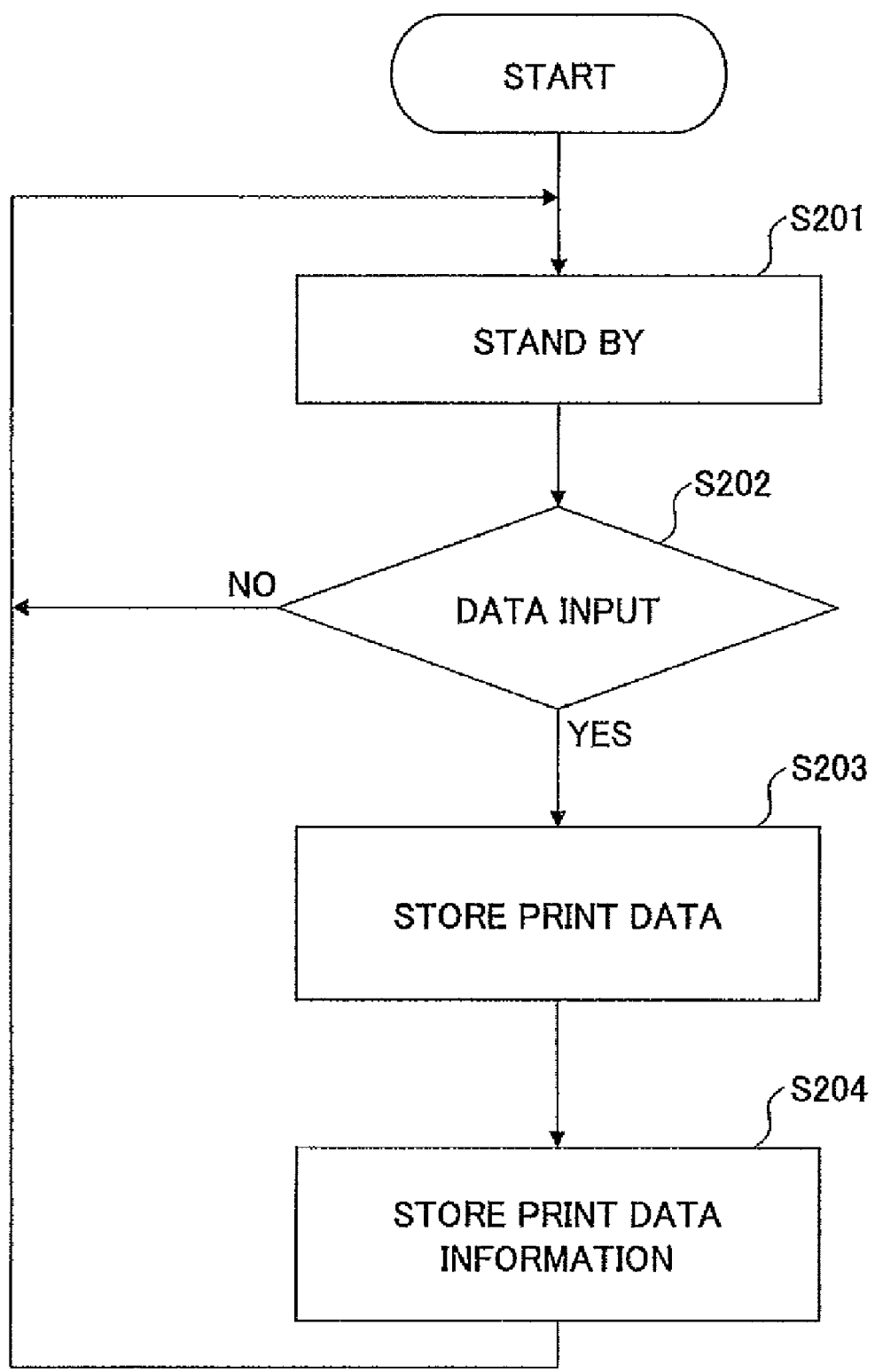
FIG. 7 is a flowchart showing an input process of print data conducted by a print data input part.

Next, the input procedure of print data will be described in detail below. FIG. 7 is a flowchart for describing the input procedure (corresponding to step S103 of FIG. 5) of print data conducted by the print data input part 13.

Under normal condition, the print data input part 13 waits (stands by) for (S201, S202) input (reception) of print data by opening ports (for example, port No. 9100) of a network printer. When detecting that print data are received (Yes in S202), the print data input part 13 writes the received print data on the HDD 102 (stores the received data, S203). Next, the print data input part 13 writes the print data information (data name, data format, date) of the print data on the HDD 102 (S204).

Further, the input procedure of the FAX data input part 14 may be similar to the case shown in FIG. 7.

Figure 8:
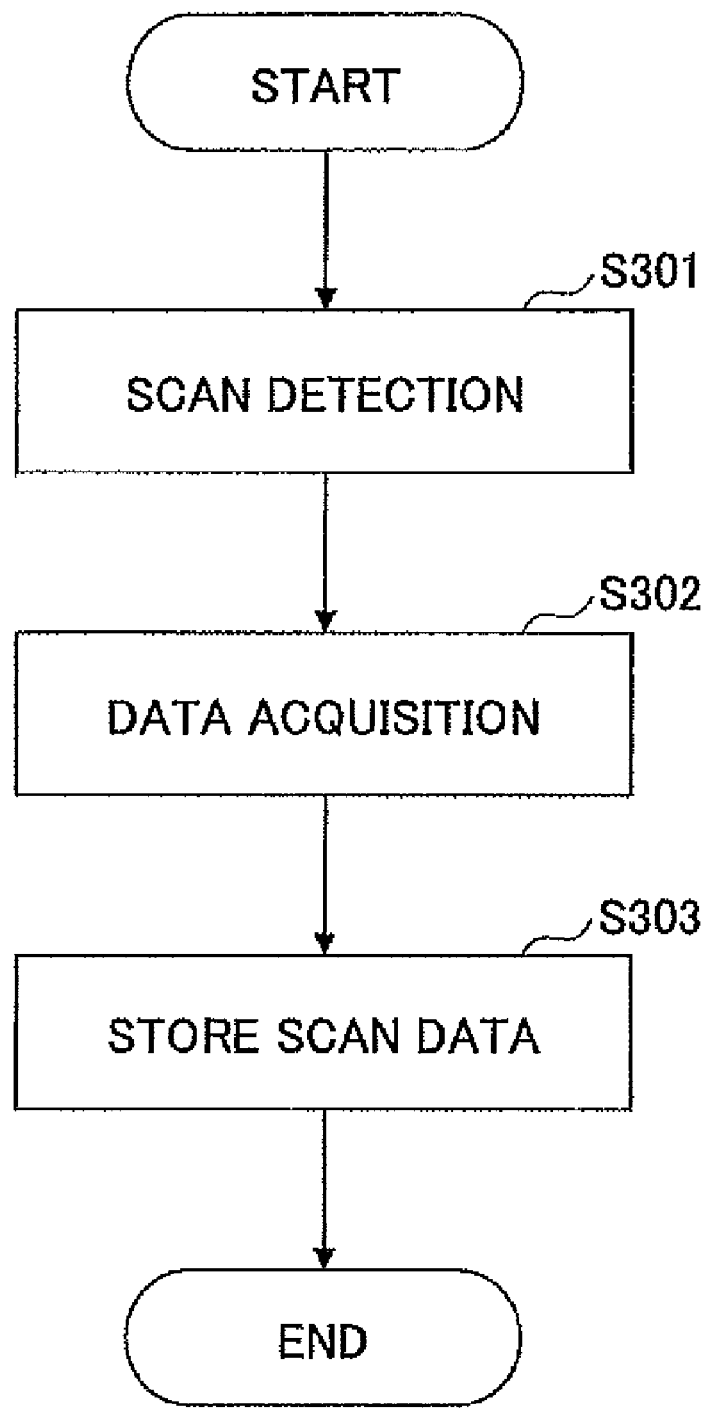
FIG. 8 is a flowchart showing an input process of scan data conducted by a scan data input part.

Next, the input procedure of scan data will be described in detail below. FIG. 8 is a flowchart for describing the input procedure of scan data conducted by the scan data input part 15.

The scan data input part 15 utilizes a remote scan protocol such as TWAIN (toolkit without an interesting name), SAN (Standard Address Number), or WS-D for detecting the execution of scan data performed by the low-end apparatus 20 (S301) and acquiring the scan data from the low-end apparatus 20 (S302). Next, the scan data input part 15 writes the acquired scan data on the HDD 102.

Further, the data management for data written on the HDD by the procedure of FIG. 7 or FIG. 8 may be performed by use of a database or a file system of an OS (Operating System).

As described above, the use of the external device 10 of this embodiment can provide performance capability (operation) of the HDD 102 even for the low-end apparatus 20 which does not include a large capacity memory device. Specifically, it is possible to store data of an image forming request, such as a print request or a FAX transmission request for the low-end apparatus 20 or the like. Also the use of the external device 10 allows the low-end apparatus 20 to execute a print job or a FAX transmission of data stored on the HDD 102.

Further, the external device 10 performs functions as an emulator of the low-end apparatus 20 for the client PC 40 and an emulator of the client PC 40 for the low-end apparatus 20. Thus, it is not necessary for the client PC 40 and the low-end apparatus 20 to install additional programs for communicating via the external device 10.

As described above, the detailed descriptions have been given for the present embodiment.

According to an aspect of the present invention, there is provided an information processing apparatus, an information processing method, and a computer-readable recording medium that can cause a computer to execute the information processing method, and which allow image forming apparatuses with no large capacity memory device to provide various types of highly convenient services.

The present invention is not limited to the specifically disclosed embodiments, and variations and modifications may be made without departing from the scope of the present invention.

The present application is based on a Japanese priority application No. 2008-006914 filed Jan. 16, 2008, the entire contents of which are hereby incorporated herein by reference.

What is claimed is:

1. An information processing apparatus connected to a client apparatus and an image forming apparatus, the information processing apparatus comprising:
   a large capacity memory device;
   a common interface device;
   a reception part compatible with the common interface device;
   a transmission part compatible with the common interface device, and
   a data conversion part configured to convert a format of the data stored in the large capacity memory device, said data conversion part including an emulating part configured to emulate a particular function of the image forming apparatus upon receiving the data, and a conversion part configured to convert the format of the data so as to be compatible with the particular function upon transmitting the data,
   wherein the information processing apparatus is configured to function as an emulator of the image forming apparatus to the client apparatus, and function as an emulator of the client apparatus to the image forming apparatus,
   wherein the reception part receives data for an image forming request from the client apparatus via the common interface device and stores the data on the large capacity memory device, and the transmission part transmits the data for the image forming request stored on the large capacity memory device to the image forming apparatus via the common interface device.

2. The information processing apparatus as claimed in claim 1, wherein the image forming request is a print request.

3. The information processing apparatus as claimed in claim 1, wherein the image forming request is a FAX transmission request.

4. The information processing apparatus as claimed in claim 1, further comprising an input device, a display device, and a list display part,
   wherein the list display part displays a stored document list screen showing a list of stored documents stored on the large capacity memory device on the display device in response to an instruction input via the input device.

5. The information processing apparatus as claimed in claim 4, wherein the transmission part transmits data selected via the stored document list screen for the image forming request.

6. An information processing method executed by an information processing apparatus including a large memory capacity device, in which the information processing apparatus is connected to an image forming apparatus including a common interface device, the information processing method comprising the steps of:
   receiving data concerned with an image forming request from a client apparatus via the common interface device;
   storing the data on the large capacity memory device;
   transmitting the data stored on the large capacity memory device to the image forming apparatus for the image forming request via the common interface device; and
   converting a format of the data stored in the large capacity memory device, said converting including emulating a particular function of the image forming apparatus upon receiving the data, and a converting the format of the data so as to be compatible with the particular function upon transmitting the data,
   wherein the information processing apparatus is configured to function as an emulator of the image forming apparatus to the client apparatus, and function as an emulator of the client apparatus to the image forming apparatus.

7. The information processing method as claimed in claim 6, wherein the image forming request is a print request.

8. The information processing method as claimed in claim 6, wherein the image forming request is a FAX transmission request.

9. The information processing method as claimed in claim 6, wherein the information processing apparatus includes an input device and a display device, the information processing method further comprising the step of:
   displaying a stored document list screen showing a list of stored documents stored on the large capacity memory device on the display device in response to an instruction input from the input device.

10. The information processing method as claimed in claim 9, wherein the transmission step includes transmitting data selected via the stored document list screen to the image forming apparatus.

11. A non-transitory computer-readable recording medium having instructions executable by a computer to execute the information processing method of claim 6.

* * * * *